United States Patent [19]

Fitch et al.

[11] Patent Number: 4,633,465
[45] Date of Patent: Dec. 30, 1986

[54] EYE VIOLATION DETECTORS

[75] Inventors: Theodore A. Fitch, Cliffwood Beach; Michael L. Steinberger, Colts Neck, both of N.J.

[73] Assignee: AT&T Bell Laboratories, Murray Hill, N.J.

[21] Appl. No.: 716,563

[22] Filed: Mar. 27, 1985

[51] Int. Cl.[4] .................... G06F 11/00; H04B 17/00
[52] U.S. Cl. ............................ 371/6; 371/5; 371/22; 375/10
[58] Field of Search ........................ 371/5-6, 371/15, 22, 48, 61, 64; 375/10, 17, 34, 39, 57-58

[56] References Cited

U.S. PATENT DOCUMENTS

| | | | |
|---|---|---|---|
| 4,034,340 | 7/1977 | Sant'Agostino | 371/5 |
| 4,207,523 | 6/1980 | Acker | 375/17 |
| 4,218,771 | 8/1980 | Hogge, Jr. | 371/61 X |
| 4,234,954 | 11/1980 | Lange et al. | 371/6 |
| 4,247,938 | 1/1981 | Kurihara et al. | 371/5 |
| 4,291,403 | 9/1981 | Waddill et al. | 371/5 |
| 4,305,150 | 12/1981 | Richmond et al. | 371/6 |
| 4,309,771 | 1/1982 | Wilkens | 375/58 |
| 4,367,550 | 1/1983 | Douverne | 371/5 |

OTHER PUBLICATIONS

Hammond et al., NTC'73, Atlanta, Ga., vol. 1, pp. 4C/1-8, Nov. 1973, "Extrapolation Monitors for Digital PSK Lines".
Hogge, Jr., NTC'77, Los Angeles, Calif., vol. 3, pp. 43.3.1-43.3.3, Dec. 1977, "Performance Monitoring of a Digital Radio by Pseudo-Error Detection".
Keelty et al., IEEE Trans. Comm., vol. COM-36, No. 8, Aug. 1978, pp. 1275-1282, "On-Line Pseudo-Error Monitors for Digital Transmission Systems".
Feher, Digital Communications: Microwave Applications, Prentice-Hall, pp. 51-60, 1981.
Hill, 1983 IEEE Military Comm. Conf., Wash., D.C., vol. 1, pp. 99-104.

Primary Examiner—Gary V. Harkcom
Attorney, Agent, or Firm—Erwin W. Pfeifle

[57] ABSTRACT

Eye violation detectors which provide either one of a "graded" or "half-graded" eye violation indicator technique. More particularly, the eye violation detector for practicing the "graded" technique provides an eye violation region in one or more eyes of a multiple eye pattern which is uniformly disposed on either side of the center of each of one or more eyes of the multiple pattern and includes a different amplitude in each of the eye patterns of interest. The eye violation detector for practicing the "half-graded" technique provides an eye violation region in one or more eyes of a multiple eye pattern which is disposed on only one side of the center of each of one or more eyes, except for the center eye of the multiple eye pattern, and includes a different amplitude in each of the eye patterns of interest.

13 Claims, 8 Drawing Figures

EYE VIOLATION DETECTORS

TECHNICAL FIELD

The present invention relates to eye violation detectors and, more particularly, to eye violation detectors which provide either one of graded or halfgraded eye violation regions within one or more eye patterns to provide a larger dynamic operating range than found using uniform eye violation regions without a serious loss of sensitivity for low degradation levels.

DESCRIPTION OF THE PRIOR ART

In communication systems which employ receivers that operate with digital signals, devices have been used to monitor the bit error rate (BER) of the received digital signal. Such devices have been used for many purposes such as, for example, to operate an alarm when the bit error rate (BER) exceeds a predetermined threshold, or as a feedback signal to control other devices.

One such monitoring device uses pseudo-error signal or eye violation detectors. In this regard see, for example, U.S. Pat. No. 4,207,523 issued to W. F. Acker on June 10, 1980; *Digital Communications*, by K. Feher, 1981, Prentice-Hall Inc. at pages 51–60; and "A Unified Analysis of 16-QAM" by T. J. Hill in *Proceedings of the 1983 IEEE Military Communications Conference*, Washington, D. C. Oct. 31–Nov. 2, 1983, Vol. 1, pages 99–104. Prior art eye violation detectors or monitors have generally applied a violation region which is uniform within the center of the eye pattern and produced an error count versus degradation curve which rose sharply and then leveled out as shown in FIG. 1. This provided a limited operating range, between points A and B in FIG. 1, covered by the width of the sharp incline section of the curve.

The problem in the prior art is to provide an eye violation detector which can operate over a greater range of the error count versus degradation curve than found in the prior art detectors without loss of sensitivity at low degradation levels.

SUMMARY OF THE INVENTION

The foregoing problem in the prior art has been solved in accordance with the present invention which relates to eye violation detectors which provide either graded or half-graded eye violation regions within one or more eyes of a multiple eye pattern to provide a larger dynamic operating range without loss of sensitivity at low degradation levels.

It is an aspect of the present invention to provide an eye violation detector which includes an arrangement that uses a half-graded or graded eye violation indicator (EVI) technique with a different eye violation region within one or more eyes of a multilevel eye pattern, where each different eye violation region can be disposed either on one or both sides, respectively, of the center of the associated eye pattern or patterns.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

The present invention relates to an eye violation detector for use in monitoring performance of, for example, a Quadrature Amplitude Modulated (QAM) input signal. It is to be understood that with such exemplary signal two eye violation detectors can be used to monitor both the In-Phase and Quadrature-Phase rails of the demodulator, although one eye violation detector would suffice for degradation measurement. It is to be further understood that the use of a QAM signal is for exemplary purposes only and not for purposes of limitation since the concept of the present invention could be extended to the monitoring of other signals. For purposes of discussion hereinafter, it will be assumed that the input signal to the present eye violation detector is a 64QAM signal and that only one rail of the demodulator is being monitored. The other rail could be monitored with an identical detector.

Figure 2:
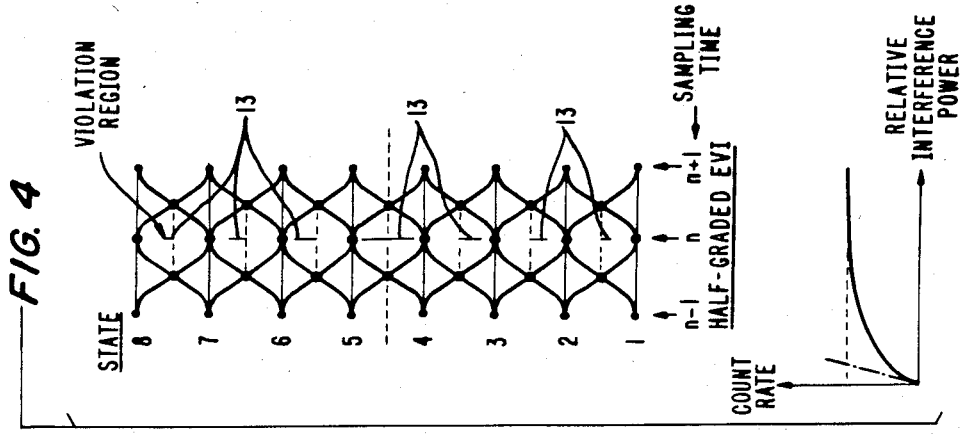
FIGS. 2–4 are concepts for three different eye violation detection techniques where the defined violation regions of a multiple eye pattern comprise amplitude windows synchronous in time and sampling times for uniform, graded and half-graded eye violation indications, respectively, in accordance with the present invention.
Figure 3:
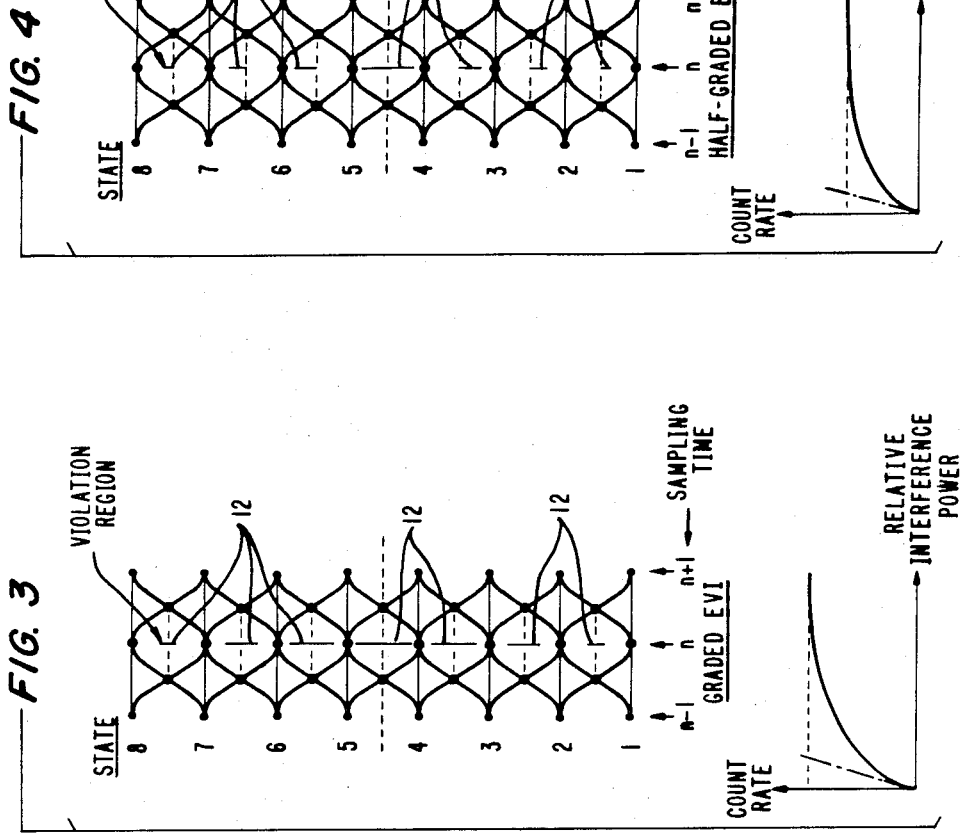
Figure 4:
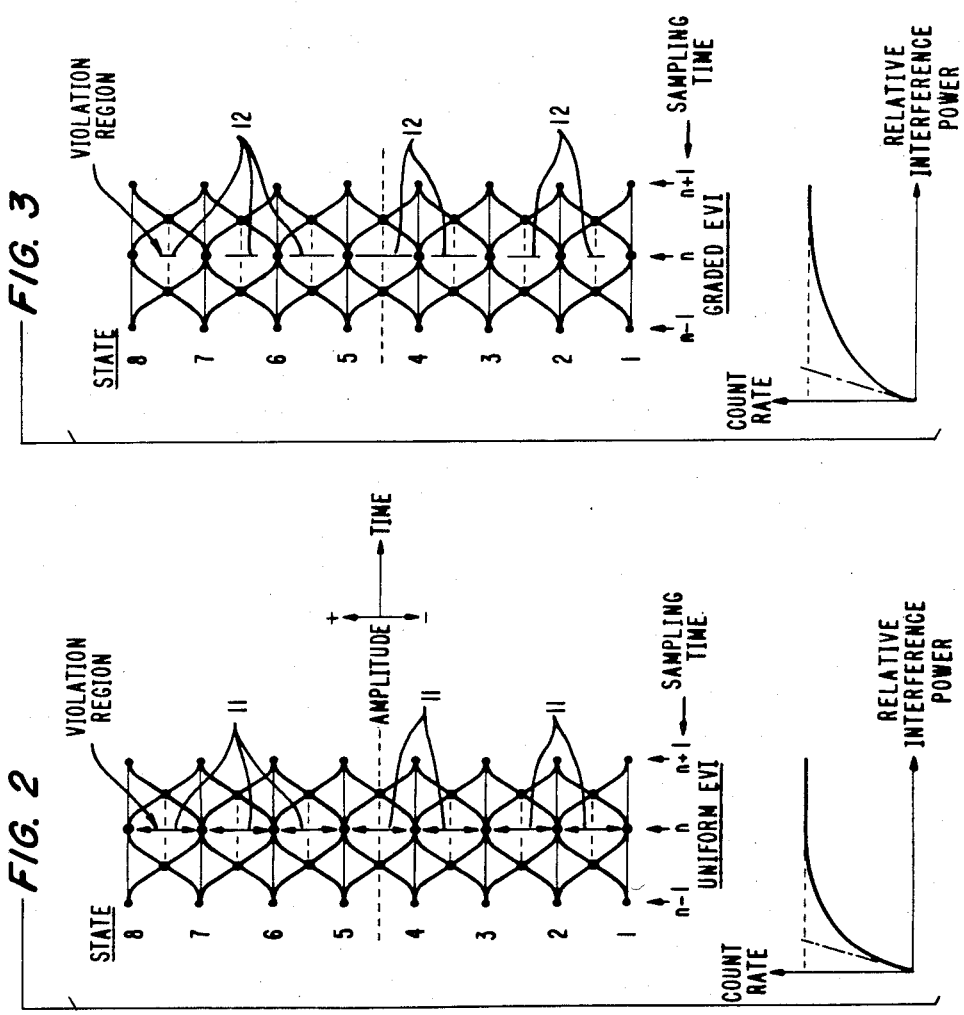

FIGS. 2–4 illustrate the concepts for three different eye violation indicator (EVI) techniques for one rail of a 64QAM input signal. At the time periods designated "n−1", "n", and "n+1" in FIGS. 2–4, the amplitude of the information signal should be at any one of the eight possible state levels and transit between these sampling time periods in a well defined manner. Viewing all possible state transitions produces open amplitude regions at the sampling times where no transition should appear. These regions are called "eyes" and their representation is called an "eye diagram". Excursions of the information signal into any eye is an eye violation indicative of signal degradation. To detect eye violations, amplitude (vertical axis) windows synchronous in time (horizontal axis) with sampling times establish eye violation regions. Any signal crossing through a violation region is interpreted as an eye violation and one pulse is generated per sampling instant to note that a violation has occurred. Only one violation per sampling period "n" can be generated because in reality the signal is making only one state transition. It is to be understood that only certain additional transitions are shown in FIGS. 2–4 for purposes of clarity in showing the eye patterns.

Figure 1:
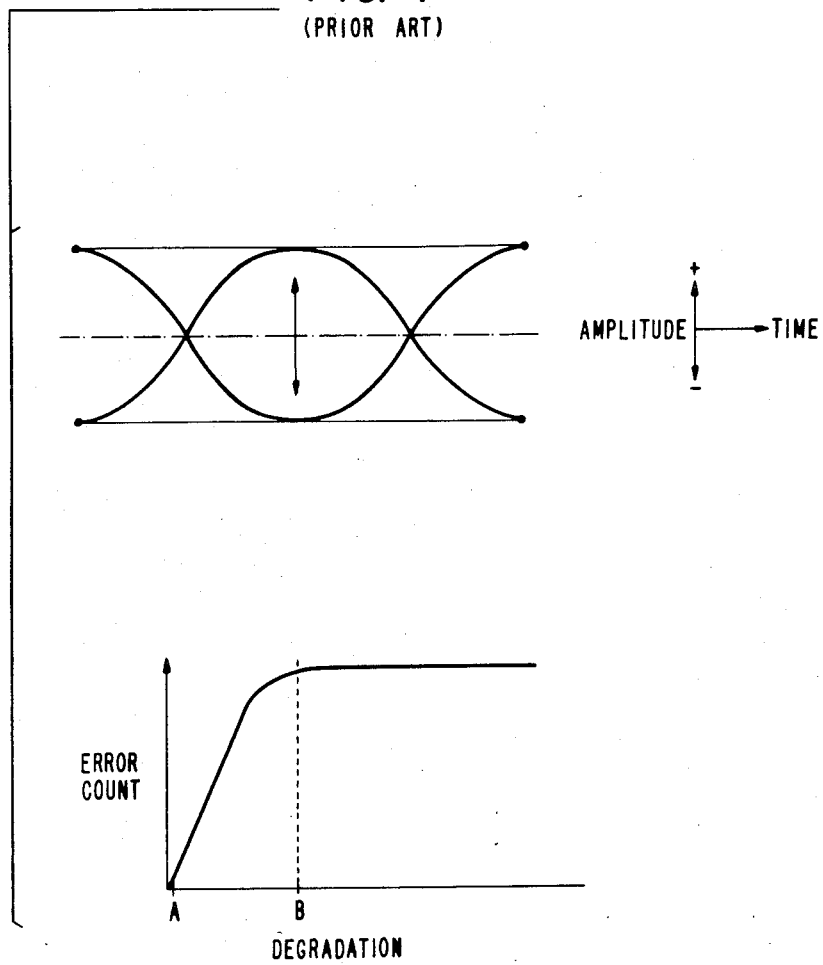
FIG. 1 illustrates an eye violation diagram and a typical resultant curve of error count versus degradation as found with prior art eye violation detectors that apply a threshold which is uniform within the center of the eye pattern.

FIG. 2 represents what will be referred to hereinafter as a "uniform" EVI technique diagram. There, violation region 11 of each eye pattern has the same sized amplitude window, thereby creating uniform eye violation monitoring. This technique is an extension of the prior art's uniform single EVI window technique shown in FIG. 1. FIG. 3 represents what will be referred to hereinafter as a "graded" EVI technique diagram in accordance with the present invention and includes a different sized amplitude eye violation region 12 in each of the eye patterns, where the largest violation window is found at the central eye and the smallest violation regions are found at the two extreme eyes. This effectively provides a weighting of the violations of the different eyes. The effect of the "graded" technique is to permit an extension of the dynamic range of the EVI monitoring found with the "uniform" EVI technique. With small degradation, the central eye violation regions retain their high sensitivity whereas the outer eye violation regions require large degradation for a violation. Since the state transitions are equally probable, the range of degradation over which violation pulses occur is statistically greater. This can be seen when comparing the count rate versus relative interference power curves of FIGS. 2 and 3.

FIG. 4 represents what will be referred to hereinafter as a "half-graded" EVI technique diagram in accordance with the present invention. The "half-graded" EVI technique is a hybrid form of the "graded" EVI technique which results from design efficiencies found by monitoring only eye violation regions 13 on one side of the center of each eye. Because of the change in polarity in monitoring each half of the overall pattern, the center eye still benefits from full eye violation windowing. As a result, the half-graded EVI technique of FIG. 4 has statistically the same sensitivity for small degradation as the graded EVI technique of FIG. 3 and retains the dynamic range of response. A longer count period is the only additional requirement to obtain the same count as the graded EVI technique.

Figure 5:
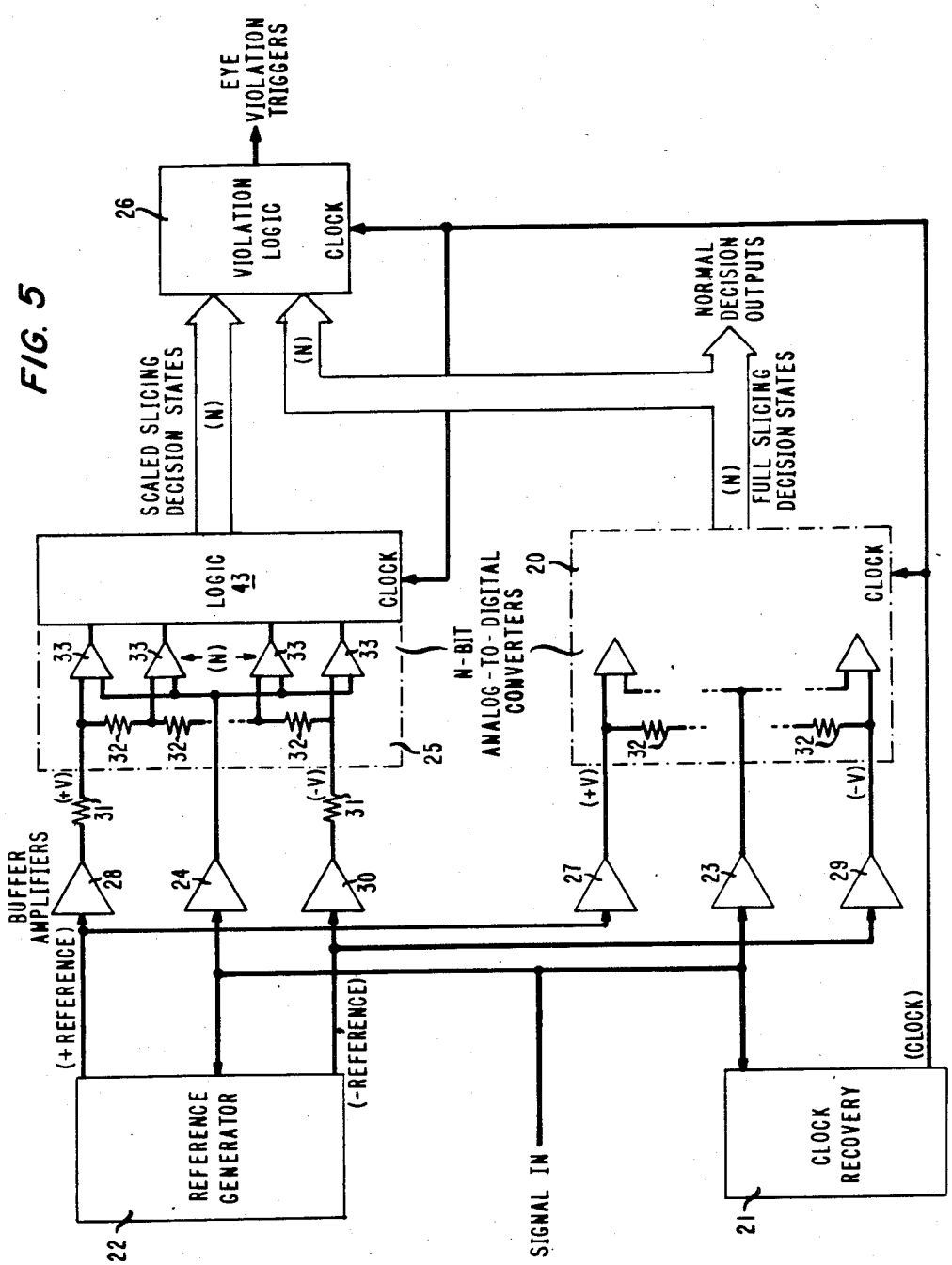
FIG. 5 is a block diagram of an eye violation detector for practicing the half-graded technique, shown in FIG. 4, in accordance with the present invention.

FIG. 5 is a simplified block diagram of an eye violation detector for the "half-graded" EVI technique of FIG. 4, the detector including a normal decision circuit 20 and an associated EVI modification arrangement in accordance with the present invention. More particularly, an input signal which can comprise, for example, one rail of a baseband 64QAM signal is provided as an input to a clock recovery circuit 21, a reference generator 22, a buffer amplifier 23 providing a central input to decision circuit 20, and a buffer amplifier 24 providing a central input to a decision circuit 25 of the EVI modification arrangement. Clock recovery circuit 21 functions to generate clock signals synchronous with the incoming signals for distribution to decision circuits 20 and 25 and a violation logic arrangement 26 forming part of the EVI modification arrangement.

Reference generator 22 functions to detect slow rate amplitude variations in the d-c level of the input signal and, in response thereto, to generate a "+reference" and "−reference" output signal which correspond to such variations. In this manner, slow amplitude variations of the input signal are automatically tracked and used for compensation purposes in the decision making process. The "+" reference signal, from reference generator 22, is transmitted to buffer amplifiers 27 and 28 which are coupled to a top input of decision circuits 20 and 25, respectively, in FIG. 5. The "−" reference signal, from reference generator 22, is transmitted to buffer amplifiers 29 and 30 which are coupled to a bottom input of decision circuits 20 and 25, respectively, in FIG. 5. It is to be understood that reference generator 22 is useful in tracking shifts in signal amplitude and DC offset in devices upstream in the signal path. Although generator 22 gives the radio system a more stable performance, it is not an absolute necessity to the function of the present eye violation detector. There are radio systems, especially for QPSK and 8PSK, which do not require an automatic threshold adjust, but instead depend on a good AGC amplifier and stable buffer circuitry further upstream in the system. All that is necessary for operation of the present eye violation detector is that there be available positive and negative reference voltages representative of the positive and negative amplitude excursions of the input signal.

Decision circuit 20 is similar to the arrangement shown for decision circuit 25 and includes a 4-bit high speed Analog-to-Digital (A/D) converter which performs the actual decision slicing of one rail of the exemplary 64QAM signal by using the digital state outputs to indicate which upper or lower portion of any eye the signal was detected in. Since QAM is by nature sensitive to amplitude fluctuations relatively slow changes in amplitude must be tracked out. The two reference voltages on each side of the resistance divider chain 32 of the A/D converters, in decision circuits 20 and 25, vary to nullify this effect. Additionally, the clock recovery circuit 21 output signal insures the sampling of the A/D converters in decision circuits 20 and 25 are synchronous with the eye center timing.

In accordance with the present invention, decision circuit 25 functions to produce the half-graded eye violation regions 13 of FIG. 4. Decision circuit 25 is shown as including a 4-bit high-speed A/D converter including resistances 32 and comparators 33 to make a separate set of decisions. The difference between decision circuits 20 and 25 is that the reference voltages for the A/D converter of decision circuit 25 are scaled by inserting series resistors 31 in the top and bottom inputs associated with the two reference signals from reference generator 22. If $R=0$, no scaling takes place in the A/D converter of decision circuit 25 and the outputs are the same as the outputs of decision circuit 20. If on the other hand the scaling is fractional ($R>0$), there will at times be a difference in the two A/D converter output states. The output from decision circuits 20 provides the normal decision output which is also combined with the output from decision circuit 25 in violation logic arrangement 26. By the use of suitable logic in arrangement 26, the difference in the digital states from decision circuits 20 and 25 form the "half-graded" eye violation regions 13 of interest. In the arrangement of FIG. 5, violation logic arrangement 26 uses all N states in generating the eye violation regions 13 of FIG. 4.

Figure 6:
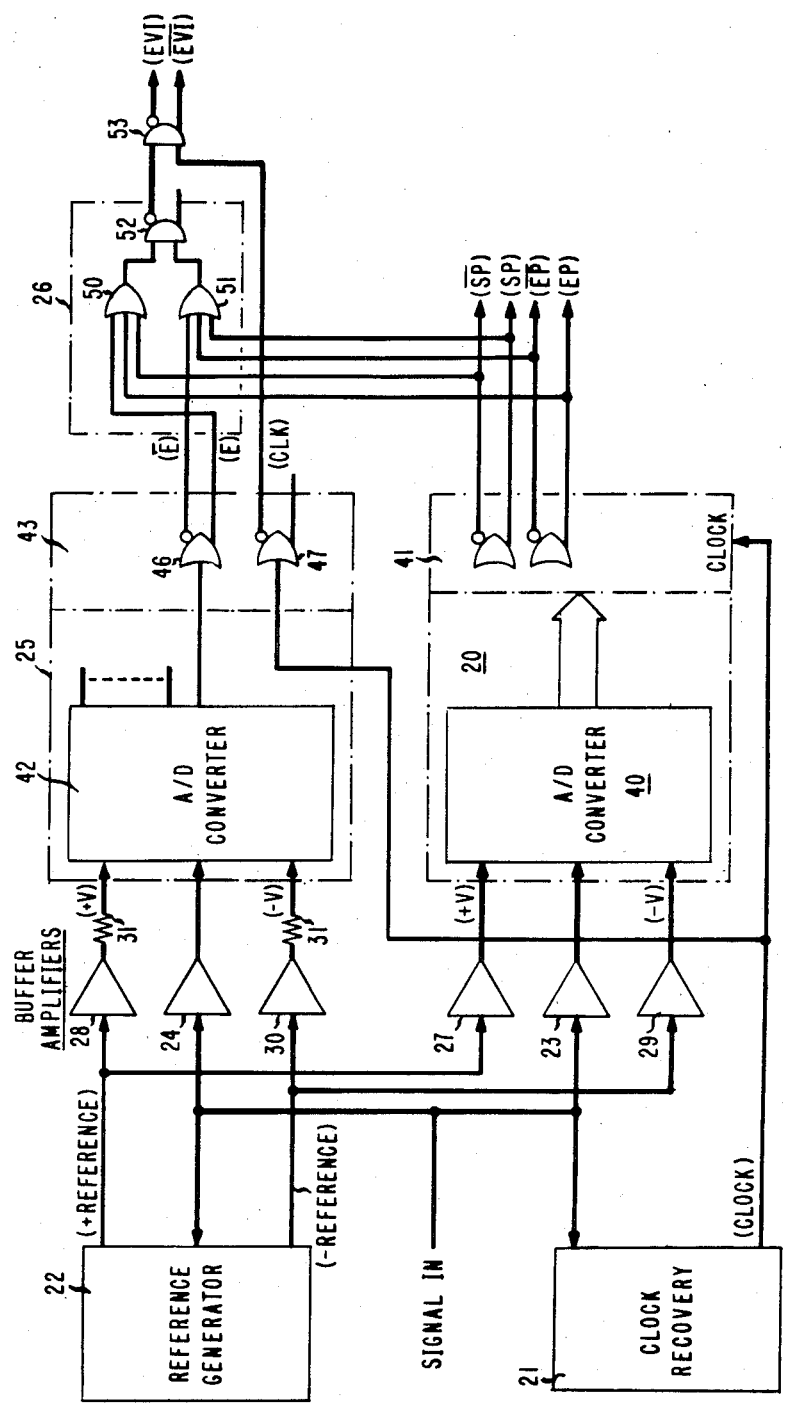
FIG. 6 is a modified diagram of the arrangement of FIG. 5 for operating with only least significant bits from the A/D Converters.

FIG. 6 illustrates a modification of the arrangement of FIG. 5 wherein only the least significant bits of decision circuits 20 and 25 and the most significant bit of decision circuit 20 are used to generate the "half-graded" eye violation regions of FIG. 4. More particularly, the scaling of the inputs to decision circuits 20 and 25 are the same as for the arrangement of FIG. 5. In decision circuit 20, the A/D converter 40 provides outputs for all N bits, but the logic circuit 41 in decision circuit 20 only provides output information to violation logic arrangement 26 relating to the most and least significant bits. These outputs are designated $S_p$ and $E_p$ with their complements obtained from the inverted output of the associated OR gates of logic 41.

In decision circuit 25 of FIG. 6, the least significant bit of the N possible bits associated with the QAM signal from the associated A/D converter 42 is shown as being the input to OR gate 46 of logic circuit 43. The non-inverted and inverted outputs from OR gate 46 provide information relating to the least significant bit from A/D converter 42 and are designated E and its complement, respectively. Logic circuit 43 also comprises OR gate 47 which has as its input the output from clock recovery circuit 21 and functions to buffer and invert the input clock signal.

The outputs E, and its complement, from OR gate 46 and the outputs $S_p$ and $E_p$, and their complements from logic circuit 41 are provided as inputs to violation logic circuit 26. Violation logic circuit 26 is shown as including a first and second OR gate 50 and 51. OR gate 50 has as separate inputs the signals E, $E_p$ and $\overline{S}_p$ from decision logic circuits 41 and 43. OR gate 51 has as separate inputs the signals $S_p$, $\overline{E}_p$ and $\overline{E}$ from decision logic circuits 41 and 43.

The outputs from OR gates 50 and 51 provide separate inputs to AND gate 52. The output from AND gate 52 provides the desired half-graded eye violation regions by executing the following Boolean expression by violation logic arrangement 26:

$$EVI = S_p * E_p * E + \overline{S}_p * \overline{E}_p * \overline{E} \quad (1)$$

The output from AND gate 52 produces the eye violation pulses which are provided as a first input to an AND gate 53. AND gate 53 includes as its second input the inverted clock pulses from OR gate 47 of decision logic circuit 43 in decision circuit 25. AND gate 53, therefore, insures that consecutive eye violations produce consecutive pulses rather than a single level shift.

Figure 7:
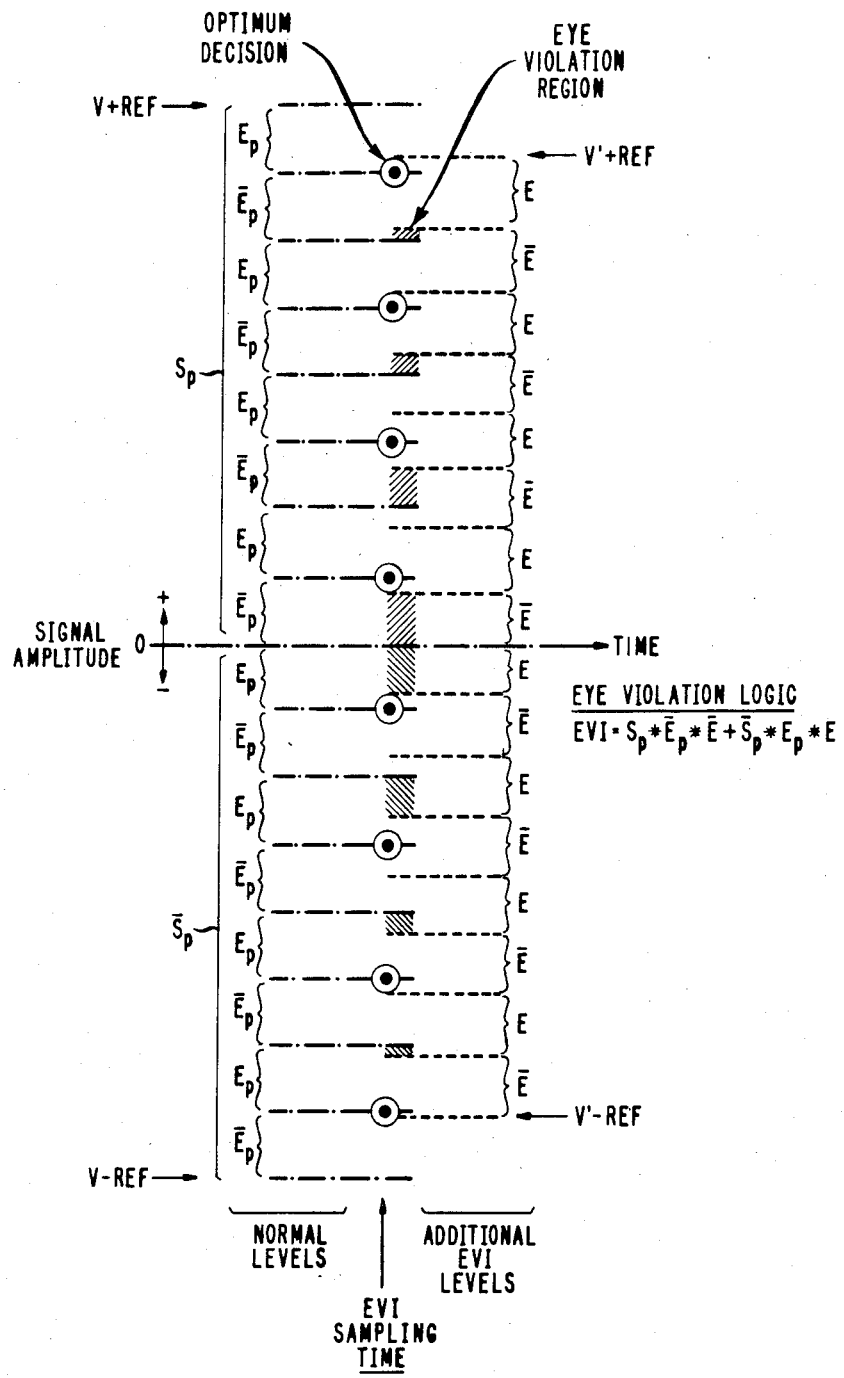
FIG. 7 illustrates and eye violation diagram of the half-graded technique generated from the arrangement of FIG. 6.

In association with the arrangement of FIG. 6, FIG. 7 provides a more specific view of the scaling process and the resulting digital states associated with decision circuits 20 and 25. In FIG. 7, signal amplitude is shown along the vertical axis and time is shown along the horizontal axis, similar to that shown in FIGS. 2-4. The optimum decision regions are synchronous with the sampling time generated by clock recovery circuit 21. Two digital bit states, designated $E_p$ and $S_p$, and their complements, for the outputs of normal decision circuit 20 are shown on the left of FIG. 7 while the one digital bit state, E, and its complement, for the scaled output of decision circuit 25 is shown on the right of FIG. 7. As can be seen in FIG. 7, the amplitude for the $E_p$ state is larger than the amplitude for the E state due to the scaling of the reference voltages from reference generator 22 by resistors 31. To obtain the desired half-graded eye violation regions, the Boolean expression of Equation (1) is executed in violation logic arrangement 26. The resulting eye violation regions are shown in the cross-hatched area in FIG. 7 and correspond to the eye violation regions shown in FIG. 4.

In order to understand the scaling process, it will be assumed hereinafter that the A/D converter in decision circuit 25 has a total resistance of, for example, $R'' = 25$ ohms for the ladder network within it. If a resistor of value R ohms is placed in series with each reference voltage source, where the reference voltages are assumed to be approximately equal in magnitude, then a voltage divider is established with a scaling factor of $$F = [R''/(R'' + 2R)]. \quad (2)$$

For the exemplary application of 64QAM, a scaling factor of ⅞ (0.875) would be desired to maximize the pulse rate near outage and yet maintain a reasonable sensitivity at high Signal-to-Interference Ratios (SIR). Using the exemplary $R'' = 25$ ohms and $F = 0.875$ results in a value of $R = 1.79$ ohms. It is to be understood that A/D converter chips can vary considerably in the value of $R''$ and, therefore, each value for R must be selected accordingly. However, once the desired scale factor is chosen, maintaining this ratio should result in similar counts.

Figure 8:
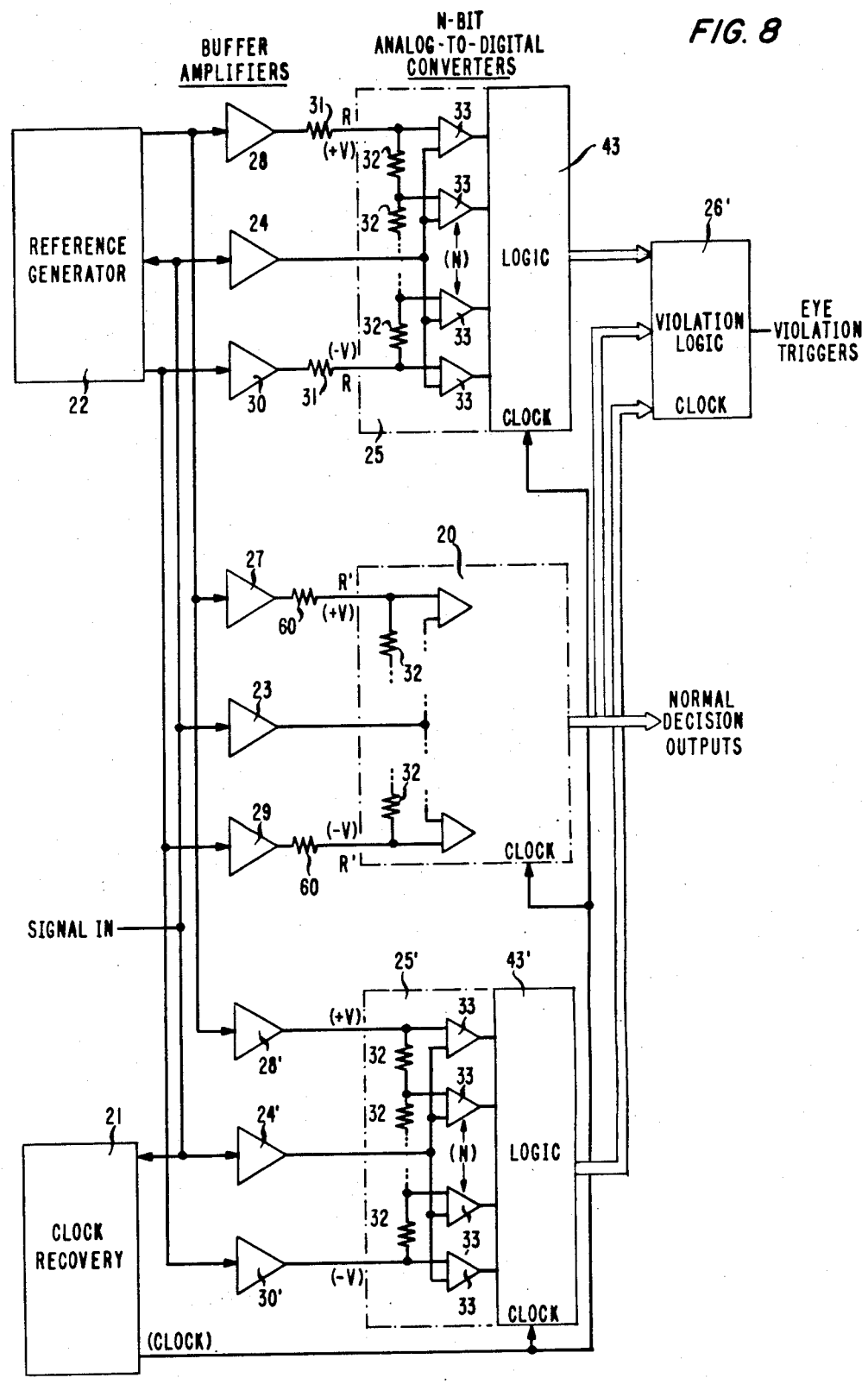
FIG. 8 is a block diagram extending the arrangement of FIG. 5 for practicing the graded technique shown in FIG. 3.

FIG. 8 is an eye violation detector for generating the "graded" EVI technique diagram of FIG. 3. The arrangement of FIG. 8 can be seen to be a mere extension of the arrangement of FIG. 5 to produce the remaining half of the eye violation regions not produced by the arrangement of FIGS. 5 and 6. In the arrangement of FIG. 8, clock recovery circuit 21, reference generator 22, and decision circuits 20 and 25, with their associated input buffer amplifiers 23, 24, and 27–30, perform the same function as described hereinbefore for the corresponding components in the arrangement of FIGS. 5 and 6. However, to obtain the graded EVI technique diagram of FIG. 3, a third decision circuit 25' has been added with associated input buffer amplifiers 24', 28' and 30' which correspond in operation to decision circuit 25 and the associated buffer amplifiers 24, 28 and 30.

In order to the achieve the appropriate scaling process and resulting digital states for the "graded" EVI technique of FIG. 3, the inputs from reference generator 22 to decision circuit 20 are scaled by a first value in a resistors R', designated 60, while decision circuit 25 has its inputs from reference generator 22 scaled by resistors 31. Added decision circuit 25' has no resistors in the inputs from reference generator 22. The resistors 31 and 60 have values relative to each other to generate appropriately scaled inverted and non-inverted E outputs at decision circuit 25, and appropriately scaled inverted and non-inverted outputs $S_p$ and $E_p$ at decision circuit 20 to produce the digital bit states shown in FIG. 7 at the output of violation logic arrangement 26'. Additionally, the resistors 60 in the reference generator inputs of decision circuit 20 provide a scaling of the non-resistored reference generator 22 inputs to decision circuit 25' such that scaled inverted and non-inverted outputs E at decision circuit 25' are moved, in FIG. 7, by an equal amount to the other side of the scaled $E_p$ states generated by decision circuit 20 to produce the missing half of the graded EVI technique diagram of FIG. 3.

Violation logic arrangement 26' of FIG. 8, effectively includes two of the circuits 26 of FIG. 6 in parallel. Both circuits 26 operate as described hereinbefore, with a first one of the circuits using the outputs from decision circuits 20 and 25 to monitor one side of each eye center of the graded EVI diagram, while the second one of the circuits uses the outputs from decision circuits 20 and 25' to monitor the other side of each eye center of the graded EVI diagram.

It is to be understood that the above-described embodiments are simply illustrative of the principles of the invention. Various other modifications and changes may be made by those skilled in the art which will embody the principles of the invention and fall within the spirit and scope thereof. For example, the buffer amplifiers in the inputs of decision circuits 20, 25 and 25' are desirable but not absolutely necessary to an understanding of the present invention. Additionally, the present technique may be applied to other multilevel signals, or to just using the eye violation region of one or more eye patterns of a multiple eye pattern instead of all of the eye patterns. For example, the detectors of FIGS. 5, 6 and 8 could only monitor the central eye of the patterns of FIGS. 3, 4 or 7.

What is claimed is:

1. An eye violation detector comprising:
   an input terminal for receiving an input signal encoded to assume a different one of a plurality of N states for each of N possible sample values at a predetermined period of time;
   first (20) decision means responsive to a received input signal and each of a first and a second reference signal representative of the positive and negative d-c amplitude variations of the received input signal for generating a digital output signal representative of the encoded state of the input signal during each predetermined transition time period between normal encoded changes in state;
   second decision means (25, 31) responsive to a received input signal and a predetermined scaled value of each of the first and second reference signals for generating a digital output signal representative of the encoded state of the input signal relative to the scaled reference signals during each predetermined transition period between normal encoded changes in state; and
   violation logic means (26) responsive to predetermined bits in the output signals of the first and second decision means for detecting, during a predetermined instant of time substantially in the center of each predetermined transition time period between state changes, whether a pseudo error has occurred and for generating an output signal representative of such pseudo error detection.

2. An eye violation detector according to claim 1 wherein the possible changes of state between the N possible sample values is capable of forming a plurality of N−1 eye patterns; and
   the violation logic means includes logic for detecting a transition within a pseudo error window on only a first side of the center of at least one of the N−1 eye patterns during the predetermined instant of time substantially in the center of each predetermined transition time period.

3. An eye violation detector according to claim 1 or 2 wherein the violation logic means is responsive to a least significant bit of the second decision means and the least significant bit and a predetermined second bit from the first decision means for determining whether a pseudo error has occurred.

4. An eye violation detector according to claim 1 or 2 wherein the first decision means comprises:
   an analog-to-digital (A/D) converter for comparing the input signal with each of the first and second reference signals and generating a digital signal representative of each decoded input signal sample value; and
   logic means responsive to the output signals from the A/D converter for generating inverted and non-inverted components of predetermined bits of each converted decoded sample value.

5. An eye violation detector according to claim 4 wherein the second decision means comprises:
   an analog-to-digital (A/D) converter for comparing the input signal with each of a predetermined scaled value of the first and second reference signals and generating a digital output signal representative of each decoded input signal sample value; and
   logic means responsive to the output signals from the A/D converter for generating inverted and non-inverted components of predetermined bits of each converted decoded sample value.

6. An eye violation detector according to claim 1 wherein the detector further comprises:
   third decision means (25') responsive to a received input signal and a predetermined second scaled value of each of the first and second reference signals, which second scaled value is different than the scaled value for the second decision means, for generating a digital output signal representative of the decoded state of each input signal sample relative to the second scaled reference signals during each predetermined transition period between normal encoded changes in state; and
   the violation logic means is also responsive to output signal from the third decision means for detecting, during the instant of time substantially in the center of each predetermined transition time period between state changes, whether a psuedo error has occurred and for generating an output signal representative of such pseudo error detection.

7. An eye violation detector according to claim 6 wherein the possible changes in state between the N possible sample values is capable of forming a plurality of N−1 eye patterns, and
   the violation logic means includes logic for detecting a transition within a pseudo error region on a first and second side of the center of at least one of the N−1 eye patterns during the predetermined instant of time substantially in the center of each predetermined transition time period.

8. An eye violation detector according to claim 2 or 7 wherein the violation logic means detects a transition within more than one eye pattern of the N−1 eye patterns and the pseudo error regions within each of said more than one eye pattern becomes smaller in a direction away from the central eye of the multiple eye pattern.

9. An eye violation detector according to claim 6 or 7 wherein the violation logic means is responsive to a least significant bit of the second and third decision means and the least significant bit and a second bit from the first decision means for determining whether a pseudo error has occurred.

10. An eye violation detector according to claim 6 wherein the third decision means comprises:
    an analog-to-digital (A/D) converter for comparing the input signal with the predetermined second scaled value of the first and second reference signals and generating a digital output signal representative of each decoded input signal sample value; and
    logic means responsive to the output signals from the A/D converter for generating inverted and non-inverted components of predetermined bits of each converted decoded sample value.

11. An eye violation detector according to claim 6, 7 or 10 wherein the first and second scaled values of the first and second reference signals used by the second and third decision means, respectively, include amplitudes which are respectively lesser and greater than the amplitude of the first and second reference signals used by the first decision means.

12. An eye violation detector according to claim 1 or 6 wherein the possible changes of state between the N possible sample values is capable of forming a plurality of N−1 eye patterns; and the violation logic means includes logic for detecting a transition on only a first and a second side of the center of the central eye of the N−1 eye patterns during a predetermined instant of time substantially in the center of each predetermined transition time period.

13. An eye violation detector according to claim 1, 2, 6 or 7 wherein the detector further comprises:

means (22) connected to the input terminal and capable of detecting slow rate positive and negative d-c amplitude variations of a received input signal and generating the first and second reference signals representative of the positive and negative slow rate d-c amplitude variations, respectively.

* * * * *